United States Patent [19]

Kira

[11] Patent Number: 5,078,759
[45] Date of Patent: Jan. 7, 1992

[54] APPARATUS AND METHOD FOR PRECIPITATING PARTICLES FROM A GASEOUS STREAM

[76] Inventor: Alan K. Kira, 1327 Kamehameha IV Rd., Honolulu, Hi. 96819

[21] Appl. No.: 597,167

[22] Filed: Oct. 15, 1990

[51] Int. Cl.$^5$ .............................................. B01D 47/02
[52] U.S. Cl. ............................................ 55/95; 55/255; 55/256; 261/121.1
[58] Field of Search ........................ 55/95, 255, 256; 261/123, 124, 22, 121.1

[56] References Cited

U.S. PATENT DOCUMENTS

| | | | |
|---|---|---|---|
| 404,621 | 6/1889 | Hibbert | 261/124 |
| 996,991 | 7/1911 | Little | 55/256 |
| 1,223,684 | 4/1917 | Fleming | 55/256 |
| 1,423,696 | 7/1922 | Stevens | 55/95 |
| 1,775,876 | 9/1930 | Vecchio | 55/256 |
| 2,178,176 | 10/1939 | Lamm | 257/121 |
| 3,219,427 | 11/1965 | Hymowitz | 261/124 |
| 3,504,481 | 4/1970 | Zakarian | 55/122 |
| 3,608,834 | 9/1971 | MacLaren | 261/121.1 |
| 3,756,580 | 9/1973 | Dunn | 261/123 |
| 3,778,978 | 12/1973 | Matsushita | 55/223 |
| 4,251,486 | 2/1981 | Sohda | 422/170 |
| 4,553,991 | 11/1985 | Barsacq | 55/218 |
| 4,721,516 | 1/1988 | Barsacq | 55/218 |
| 4,818,259 | 4/1989 | Marano | 55/227 |

FOREIGN PATENT DOCUMENTS

| | | | |
|---|---|---|---|
| 65524 | 11/1892 | Fed. Rep. of Germany | 261/124 |
| 321816 | 5/1902 | France | 261/123 |
| 462181 | 2/1951 | Italy | 261/121.1 |
| 73795 | 11/1916 | Switzerland | 55/255 |

*Primary Examiner*—Bernard Nozick
*Attorney, Agent, or Firm*—Shlesinger, Arkwright & Garvey

[57] ABSTRACT

An apparatus for precipitating particles, debris and the like from a gaseous stream, comprises an enclosed vessel partly filled with a liquid to a level and having a bottom wall; a passageway operably associated with the vessel for admitting the gaseous stream laden with particles into the vessel; an outlet operably associated with the vessel disposed above the liquid level for exhausting the gaseous stream; an atomizer disposed below the liquid level and operably associated with an end portion of the passageway for breaking up the gaseous stream into a multitude of bubbles. The atomizer includes a top wall and a depending side wall and a plurality of openings disposed in one of the walls adapted to break up the gaseous stream into the multitude of bubbles, thereby to promote substantial surface area contact between the particles and the liquid and cause precipitation of the particles from the gaseous stream onto the bottom wall of the vessel.

9 Claims, 4 Drawing Sheets

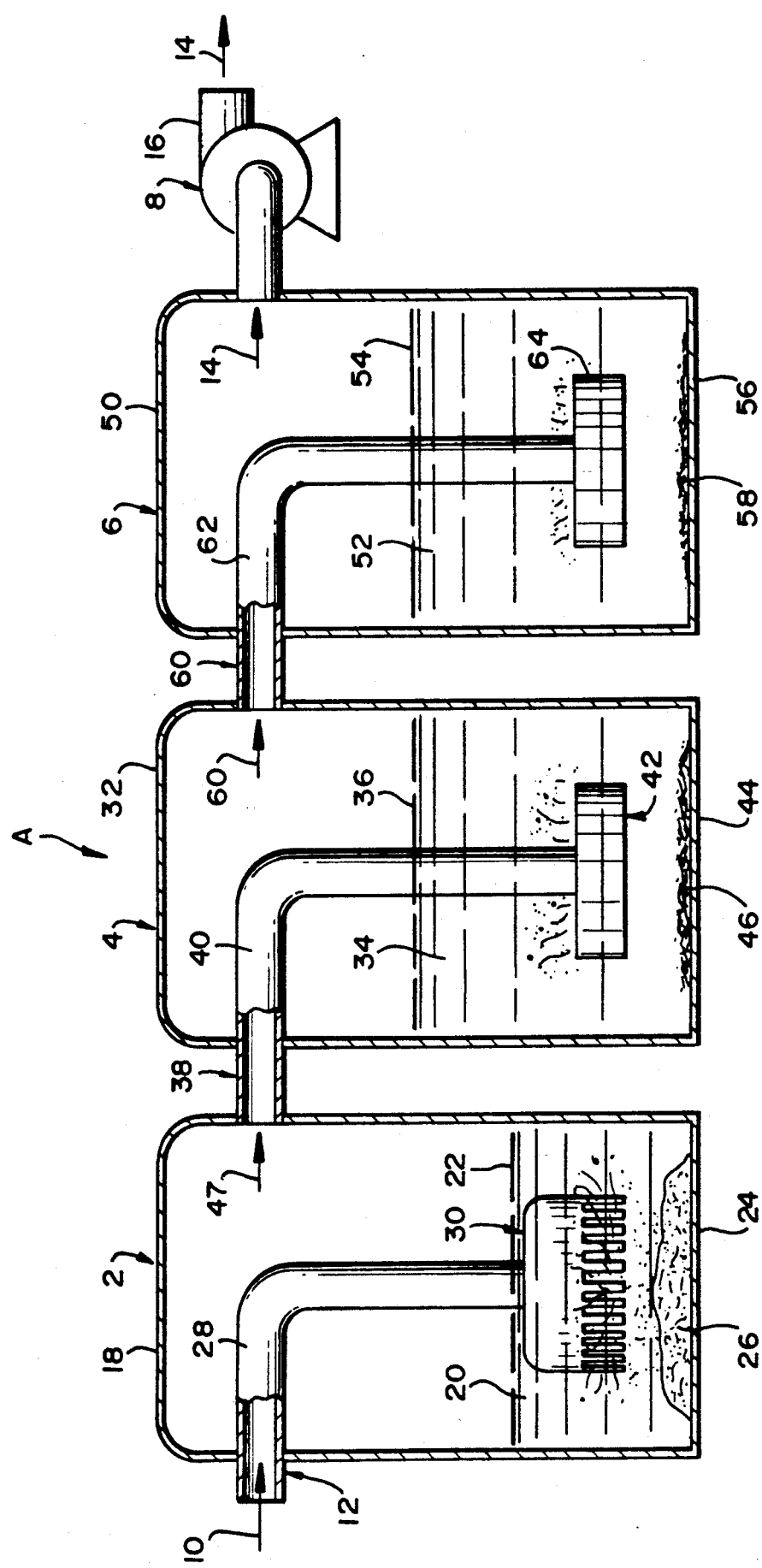

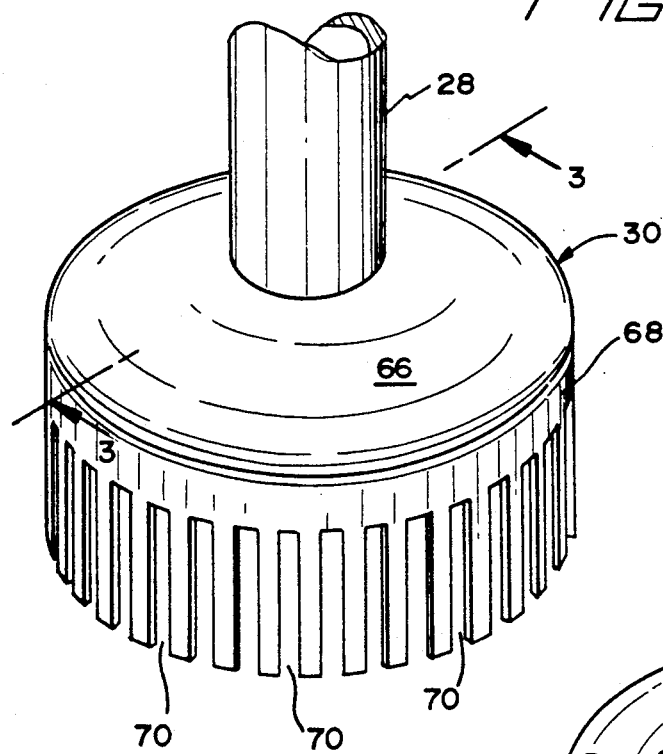
FIG_2
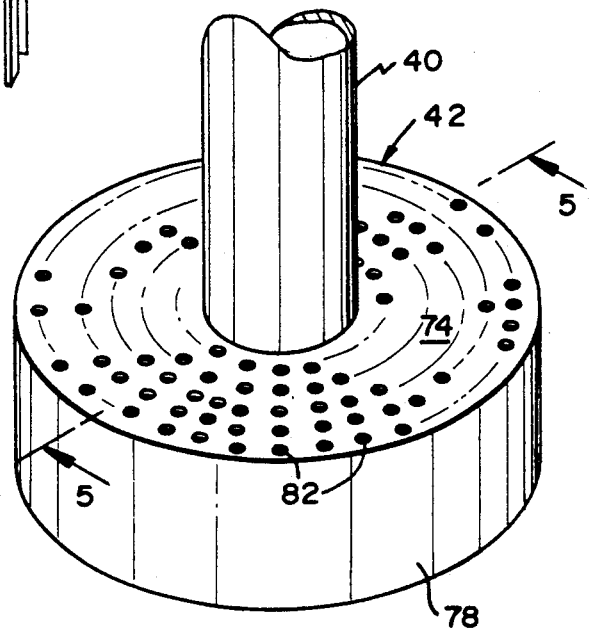
FIG_4
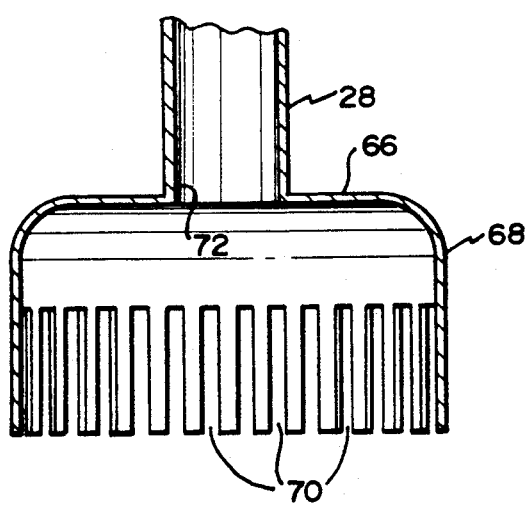
FIG_3
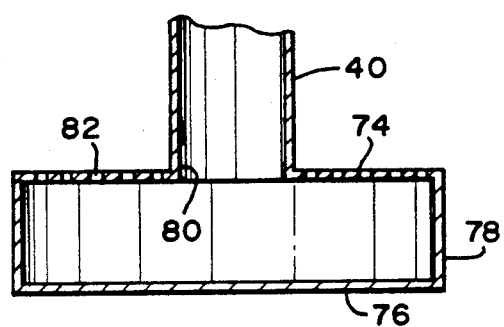
FIG_5

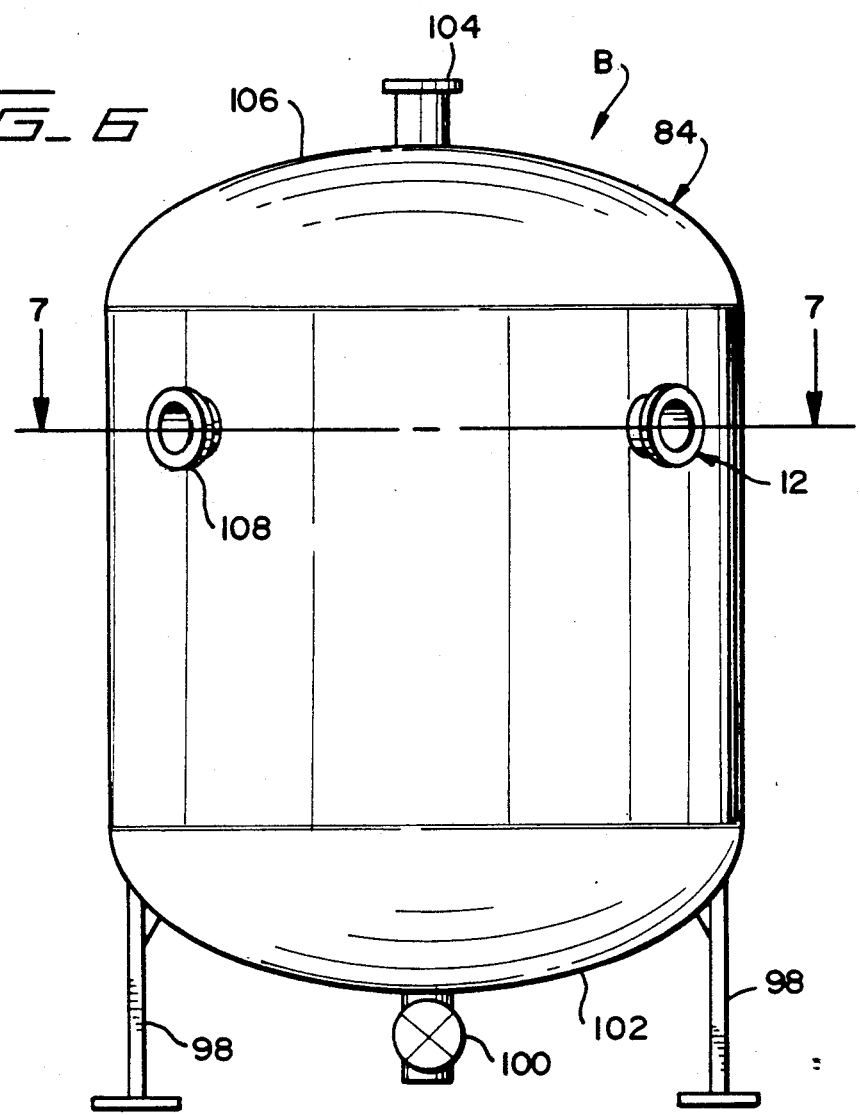
FIG_6
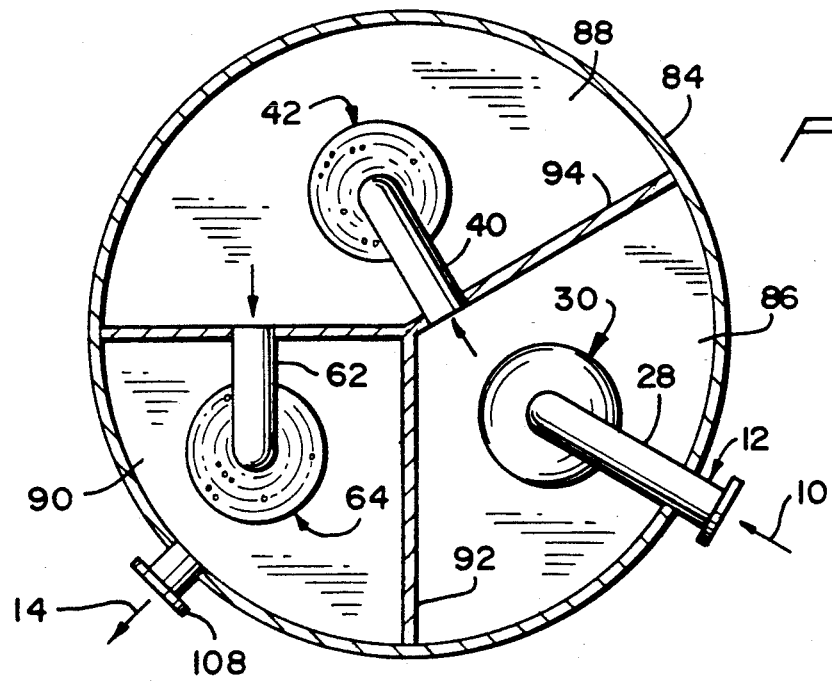
FIG_7

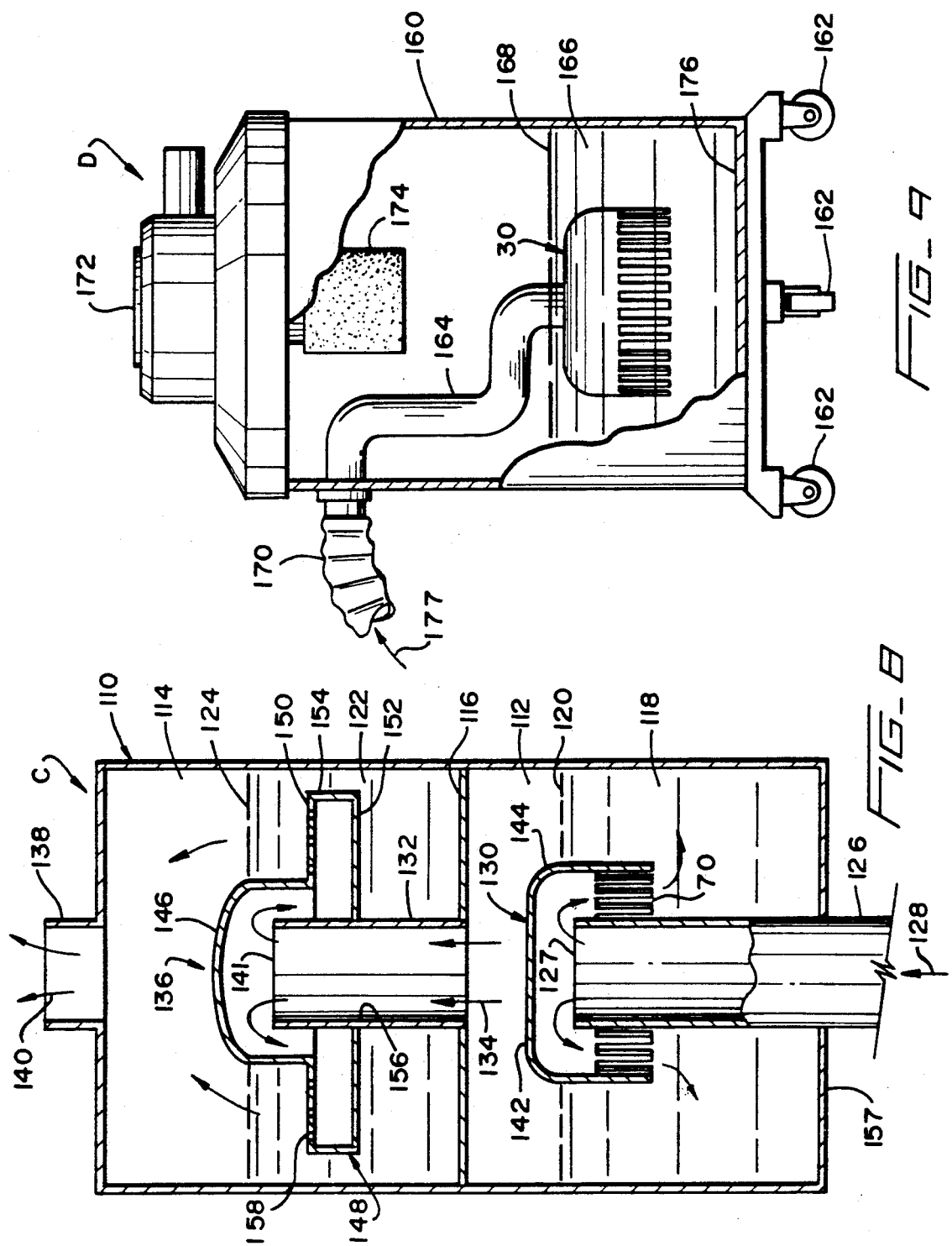

APPARATUS AND METHOD FOR PRECIPITATING PARTICLES FROM A GASEOUS STREAM

FIELD OF THE INVENTION

The present invention relates generally to an apparatus and method for removing air-borne particles from a gas/air stream, and in particular to a precipitator utilizing liquid for precipitating particles from the gas/air stream.

BACKGROUND OF THE INVENTION

There are presently several general methods used to remove air borne particles from a gas/air stream, such as centrifugal separation, filtration, gravitational settling, wet scrubbing, and electrostatic precipitation.

In centrifugal separation, gravitational settling and electrostatic precipitation, suspended particles are subjected to forces created either mechanically or electrically that cause precipitation from the gas/air stream. The efficiency these methods depends upon the accuracy or balance of the forces causing the precipitation.

The filtration method places a filtration media directly in the gas/air stream to remove suspended particles.

In the wet scrubbing method, water or a liquid solution is used to cause particle precipitation. Droplets from a water spray in a wet scrubber collide with the air or gas stream, causing particle precipitation. Water is also introduced into electrostatic precipitators to assist in removing particles attached to the charged plates of the precipitators.

Water is also used to "wash" the gas/air stream; however, the efficiency of the devices depend mainly on the mechanical features, i.e., ducts, chambers, partitions, sprays, pressure, etc., that cause the gas/air stream to move within the designed architecture and permit the gas/air stream and the liquid to contact each other.

The degree of contact between the gas/air stream and the precipitating liquid determines the efficiency of particle precipitation from the stream into the liquid. The effectiveness of a liquid to cause suspended particles to precipitate is in the degree of contact that the liquid makes with the gas/air stream.

The cost to manufacture and maintain these systems over a long period of time to within designed standards can be considerable when used to service high volume requirements, such as those typically found in manufacturing facilities, building ventilation (HVAC) systems, etc.

OBJECTS AND SUMMARY OF THE INVENTION

It is therefore an object of the present invention to provide an apparatus and method for precipitating particles from an air/gas stream that is relatively economical to manufacture and maintain.

It is another object of the present invention to provide an apparatus and method for precipitating particles from an air/gas stream that utilizes liquid, such as water, as the precipitating medium.

It is still another object of the present invention to provide an apparatus and method for precipitating particles from an air/gas stream wherein the stream is broken up into multitude of tiny bubbles in a liquid precipitating medium.

It is yet another object of the present invention to provide an apparatus and method for precipitating particles from an air/gas stream that is relatively free of electrical and mechanical complexities, thereby making it readily adaptable to many applications for home and building air quality control, HVAC systems, factories and manufacturing facilities, vacuum cleaners, mechanized street cleaners, and particle removal from high volume air flow into internal combustion engines used in extremely sandy or dusty environments such as a desert operation by vehicles, etc.

It is an object of the present invention to provide an apparatus and method for precipitating particles from an air/gas stream that prevents the creation of atmospheric dust during maintenance, since the precipitated particles are held captive by the liquid precipitating medium.

In summary, the present invention provides an apparatus and method for precipitating particles from a air/gas stream by breaking up the stream into a multitude of tiny bubbles within a liquid.

These and other objects of the present invention will become apparent from the following detailed description.

BRIEF DESCRIPTIONS OF THE DRAWINGS

FIG. 1 is a schematic view of a precipitator according to the present invention, with portions shown broken away and in cross-section.

FIG. 2 is a fragmentary, top perspective view of an atomizer in accordance with the present invention.

FIG. 3 is a cross-sectional view taken along line 3—3 of the atomizer in FIG. 2.

FIG. 4 is a fragmentary, top perspective view of another atomizer made in accordance with the present invention.

FIG. 5 is a cross-sectional view taken along line 5—5 of the atomizer in FIG. 4.

FIG. 6 is an elevational view of an alternative embodiment of a precipitator according to the present invention.

FIG. 7 is a cross-sectional view taken along lines 7—7 of the precipitator in FIG. 6.

FIG. 8 is a schematic, cross-sectional view of another alternative embodiment of a precipitator according to the present invention.

FIG. 9 is a vacuum cleaner in accordance with the present invention, with portions shown in cross-section and broken away.

DETAILED DESCRIPTION OF THE INVENTION

An embodiment of a precipitator A in accordance with the present invention is disclosed in FIG. 1. The precipitator A includes a first stage 2, a second stage 4 and an optional third stage 6. A fan 8 forces particle-laden air/gas stream 10 at inlet 12 that is operably associated with the first stage 2 and exhausts filtered air 14 at outlet 16, that is operably connected to the third stage 6. A person of ordinary skill in the art will understand that if the third stage is not used, the fan 8 would be operably connected to the second stage 4 in a similar manner as that shown for the third stage 6.

The first stage 2 has an enclosed vessel or container 18 that is partly filled with a liquid 20, such as water, to a level generally indicated at 22. The vessel 18 has a bottom wall 24 on which the precipitated particles 26 from the air/gas stream 10 collect.

The inlet 12 is a passageway 28, such as a tube, hose, duct, etc., that terminates and communicates with an atomizer 30, which will be described below. The atomizer 30 is disposed below the water level 22.

The second stage 4 includes an enclosed vessel or container 32 that is partly filled with a liquid 34, such as water, to a level 36. The second stage 4 has an inlet 38 that is operably connected to the first stage 2 at a point above the water level 22 such that the air/gas stream 10, after passing through the water 20, is admitted to the second stage 4. The inlet 38 is a passageway 40, similar to the passageway 28 of the first stage 2. The passageway 40 terminates into an atomizer 42, which will be described below. The atomizer 42 is disposed below the water level 36.

The vessel 32 has a bottom wall 44 on which precipitated particles 46 collect from the air/gas stream 47 entering from the first stage 2.

The third stage 6 has an enclosed vessel or container 50 that is partly filled with a liquid 52, such as a chemical wash, to a level 54. The vessel 50 has a bottom wall 56 on which precipitates generated from chemical reaction with the incoming air stream 60 and the chemical wash 52 collect.

The third stage 6 has an inlet 60 that is operably connected to the second stage 4 such that the incoming air stream 60 is admitted to the third stage 6. The inlet 60 is a passageway 62 that is similar to the passageway 28 and terminates and communicates with an atomizer 64. The atomizer 64 is disposed below the chemical wash level 54. Outgoing air stream 14 exits through the fan outlet 16.

The atomizer 30 has a top wall 66 outwardly extending from the passageway 28 and a depending side wall or skirt 68, as best shown in FIG. 2. The vertical wall 68 has a plurality of vertical, rectangular slits 70 that are evenly spaced around the wall 68, as best shown in FIG. 2. The atomizer 30 communicates with the passageway 28 through an opening 72 in the top wall 66. The atomizer 30 is open at the bottom to allow bulk particles 26 to collect at the bottom wall 24. The slits 70 break up the air/gas stream 10 into a multitudes of bubbles to precipitate the particles 26 to the bottom wall 24.

The atomizer 30 is substantially circular in plan view to advantageously provide uniform distribution of the air/gas stream 10 through the slits 70. Preferably, the diameter of the atomizer 30 is such that the bubbles generated through the slits 70 around the side wall 68 are not localized within a narrow vertical portion of the liquid 20. The diameter of the atomizer 30 is such that uniform turbulence is generated within the liquid 20. Preferably, the diameter of the atomizer 30 is approximately between $\frac{1}{4}$ to $\frac{3}{4}$ of the diameter of the container 18.

The atomizer 42 is preferably a cylindrical hollow body having a top wall 74, a bottom wall 76 and a vertical side wall 78 connected to the top and bottom walls 74 and 76, respectively, as best shown in FIGS. 4 and 5. An opening 80 permits the interior of the atomizer 42 to communicate with the passageway 40, as best shown in FIG. 5. The top wall 72 has a plurality of openings 82 to break up the air/gas stream 47 entering the second stage 4 into a multitude of bubbles that are individually smaller in size than those generated by the atomizer 30 in the first stage 2. The bottom wall 76 provides a baffle to the air/gas stream 47 for uniform distribution of the stream through the holes 82 on the top wall 74. The diameter of the atomizer 42 is sized for optimum generation of bubbles in the liquid 34.

Another alternative embodiment of the present invention is disclosed in FIG. 6 as precipitator B, which is similar to the precipitator A. The precipitator B has an enclosed vessel or container 84 that is subdivided into a first stage compartment 86, a second stage compartment 88 and an optional third stage compartment 90 by means of dividers 92, 94 and 96, respectively, as best shown in FIG. 7. The atomizers 30, 42 and 64, along with the associated passageways 28, 40 and 62, respectively, are used in the precipitator B in the same manner as described in the precipitator A. The liquid levels in the respective compartments are similar to that shown in the precipitator A.

The vessel 84 is disposed in a vertical position by means of legs 98 in such a way that the dividers 92, 94 and 96 are vertically disposed. A slurry discharge valve 100, which is operably connected to each of the compartments 86, 88 and 90, provides a means for removing the precipitated particles at the bottom 102 of the vessel 84. Liquid make-up inlet 104 is disposed at a top portion 106 of the vessel 84 and is operably connected to each of the compartments 86, 88 and 90. Air/gas stream 10 enters the vessel 84 via the inlet 12 and exhausts as filtered stream 14 at outlet 108, as best shown in FIG. 7.

Another alternative embodiment of a precipitator according to the present invention is disclosed in FIG. 8 as precipitator C. The precipitator C has an enclosed vessel or container 110 divided into a first stage compartment 112 and a second stage compartment 114 by means of a divider 116. The first stage compartment 112 is partly filled with a liquid 118, such as water. The second stage compartment 114 is partly filled with liquid 122, such as water, to a level 124. Inlet pipe 126 is operably connected to the first stage compartment 112 such that an incoming stream 128, which is to be filtered, is permitted to enter the first stage compartment 112 through the slits 70 of an atomizer 130, which is similar to the atomizer 30 as disclosed in FIGS. 2 and 3. The liquid level 120 is disposed below top edge 127 of the inlet 126.

An inlet pipe 132 is operably connected to the first stage compartment 112 and the second stage compartment 114 such that air/gas stream 13 exiting from the first stage compartment 112 is permitted to enter the second stage compartment 114 and to pass through an atomizer 136, which is similar to the atomizer 42 as disclosed in FIGS. 4 and 5. An outlet 138 is operably connected to the second stage 114 such that filtered air stream 140 is permitted to exit to the conditioned environment. The liquid level 124 is disposed below top edge 141 of the inlet 132.

The atomizer 130 is operably connected to the inlet pipe 126 by standard means, such as narrow brackets (not shown) that will not obstruct the air stream 128.

The atomizer 130 has a top wall 142 and a depending side wall 144 with a plurality of vertical, rectangular slits 70.

The atomizer 136 has a dome-like structure 146 connected to a substantially hollow cylindrical structure 148 having a top wall 150, a bottom wall 152, and a side wall 154 connected to the top wall 150 and the bottom wall 152. An opening 156 permits the inlet pipe 132 to communicate with the interior of the atomizer 136. A plurality of holes 158 are disposed through the top wall 150 in similar fashion as for the atomizer 42, shown in FIGS. 4 and 5.

The first stage compartment 112 has a bottom floor 157 on which precipitated particles collect. The precipitated particles in the second stage compartment 114 collect on the divider 116.

Another alternative embodiment of a precipitator according to the present invention is disclosed in FIG. 9 as a vacuum cleaner D, having a housing 160 disposed on a plurality of casters 162. An inlet pipe 164 is connected to the atomizer 30, which is disposed in the water 166 below level 168. A flexible hose 170 connects to a nozzle (not shown) for picking up dirt, particles, debris, etc. from a surface to be cleaned. An electric motor 172 with a foam filter 174 generates an air stream 177 through the hose 170 to carry the particles from the surface being cleaned into the housing 160.

The housing 160 has a bottom floor 176 on which the precipitated debris and particles collect.

OPERATION

The operation of the present invention will be described with reference to the precipitator A. A person of ordinary skill in the art will understand that the operation of the precipitators B and C and the vacuum cleaner D will be apparent from the description of the operation of the precipitator A, so that the operation of the other alternative embodiments of the invention will not be described.

The ideal precipitator will completely remove foreign or undesired particles from the air/gas stream by causing total contact between the air/gas stream and the precipitation media, such as water, with the suspended particles, resulting in the precipitation occurring at the point of contact.

The precipitator A causes precipitation of the particles in the air stream 10 by fragmenting and atomizing the air stream 10 into minuscules of very tiny spheres, cells or bubbles to create a large amount of surface area contact between the air/gas stream 10 and the liquid 20, 34, 52 or 166, resulting in suspended particle contact, capture and precipitation. The greater the surface area of the air/gas stream that is presented to the precipitating liquid, the greater the amount of precipitation that will occur. One of ordinary skill in the art will understand that total surface area of the air/gas stream 10 increases tremendously as the air/gas stream is broken up into progressively smaller and still smaller bubbles within the precipitating liquid. For example, the total number of ⅛" spheres contained within a 1" sphere will have a total surface area of 8 times the surface area of the 1" sphere.

The first stage 2 is used to precipitate rather large debris from the air stream 10, such as those found around the home that settles on the floor, ground, furniture, etc. The second stage of 4 is used to precipitate smaller sized particles that escape from the first stage 2 and that are typically air-borne easily because of their size, such as pollen, dust, etc.

Because of the wide range of particles passing through the first stage 2, the atomizer 30 is designed to trap large debris while at the same time causing a sufficient amount of air/gas stream atomization to precipitate as much of the suspended particles as possible before it reaches the second stage 4. The second stage 4 anticipates controlled particle sizes and it is designed with the holes 82 of a certain size to permit smaller sized bubbles compared to the stage 2 bubbles. The second stage 4 is limited to particle sizes not larger than the size of the openings 82. Each succeeding stage precipitates smaller and smaller suspended particles.

The slits 70 of the atomizer 30 is submerged below the liquid level 22 to insure maximum turbulence from the air/gas stream 10, which is drawn through the precipitator A by the fan 8.(footnote 1) The fan 8 is strong enough to pull the air/gas stream 10 through the first, second and third stages 2, 4 and 6, respectively, to create a generous amount of turbulence in the first stage 2. The distance from the liquid level 22 to the top of the slits 70 is adjusted for maximum turbulence, depending on the flow rate of the air/gas stream 10 generated by the fan 8. The fan 8 generates enough pressure to force the air/gas stream 10 through the slits 70. The air/gas stream 10 should not escape the slits 70 through the open bottom of the atomizer 30. The air/gas stream 10 is forced through the slits 70 by adjusting the fan pressure and/or increasing the length of each of the slits 70. Maximum, uniform distribution of the bubbles generated in the liquid 20 is thereby effected.

1) For internal combustion engine application a person of ordinary skill in the art will understand that an engine created vacuum may be substituted for the fan 8.

The minimum distance from the bottom wall 24 of the vessel 18 to the bottom of the slits 70 should be such as to enable passage of the largest expected bulk debris entering the first stage 2 to settle to the bottom wall 24. The holding capacity of the vessel 18 for the precipitated debris 26 may be increased by increasing the distance between the bottom of the slits 70 and the bottom wall 24 of the vessel 18.

The incoming air/gas stream 47 entering the second stage 4 contains particles that escaped precipitation in the first stage 2. The air/gas stream 47 is broken up into a multitude of bubbles when forced through the plurality of holes 82. The generated bubbles provide substantial surface area contact between the air/gas stream 47 and the precipitating liquids to capture the particles and cause precipitation to the bottom wall 44 of the container 32. The holes 82 are designed such that the particles in the air/gas stream 47 can pass therethrough without clogging the openings 82. The openings 82 are preferably spaced greater than one diameter apart.

The atomizer 42 is disposed below the liquid level 36 at a distance greater than the distance from the liquid level 22 and the top of the slits 70 in the first stage 2. This permits longer transit time for the generated bubbles to reach the surface level 36, and thereby cause greater precipitation of the particles.

The air/gas stream 60 exiting the second stage 4 is substantially filtered of debris and particles and may be discharged directly into the controlled environment However, the optional third stage 6 may be used to further condition the air/gas stream 60. The third stage 6 may include chemicals in the liquid 52 to extract certain elements from the air/gas stream 60 or neutralize gases present in the stream. The third stage 6 may also include humidification, de-humidification, cooling, heating, etc.

The liquids 20, 34, 52 or 166 may contain antiseptic solutions and fragrance for bacterial control and for de-odorizing the controlled environment, respectively.

The present invention provides an effective way in which the air/gas stream 10 can be brought into total contact with the precipitating liquids 20, 34, 52 or 166 efficiently and cost effectively without much electrical/mechanical complexity. By breaking down the air stream 10 into minuscules of tiny cells by means of the slits 70 and the openings 82, the total combined surface area of the bubbles thereby generated increases tremendously to provide substantial surface area contact between the air/gas stream 10 and the precipitating liquids.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

I claim:

1. A multi-stage precipitator, comprising:
   a) at least first and second vessels each being partly filled with a liquid to a respective level and each having a bottom wall and an inlet;
   b) first and second conduits operably associated with said at least first vessel and second vessels inlets, respectively, for admitting gaseous stream laden with particles into respective said at least first and second vessels;
   c) each of said first and second conduits including an end portion; thereby causing substantial surface area contact between the gaseous stream and the liquid in each of said vessels to precipitate the particles from the gaseous stream onto said bottom wall of said at least first and second vessels.

2. A multi-stage precipitator as in claim 1, wherein:
   a) each of said slits has a top edge; and
   b) said top edge is disposed below said first liquid level.

3. A multi-stage precipitator as in claim 1, wherein:
   a) said slits are rectangular and evenly spaced around said side wall.

4. A multi-stage precipitator as in claim 1, wherein:
   a) said cup has a bottom edge; and
   b) said bottom edge is disposed above said first vessel bottom wall.

5. A multi-stage precipitator as in claim 1 herein:
   a) said openings are holes spaced evenly on said top wall.

6. A multi-stage precipitator as in claim 1, wherein:
   a) said first and second vessels are disposed in one enclosure.

7. A multi-stage precipitator as in claim 6, wherein:
   a) said first and second vessel are disposed horizontally next to each other.

8. A multi-stage precipitator as in claim 6, wherein:
   a) said first vessel is disposed below said second vessel.

9. A method for precipitating particles from a gaseous stream, comprising the steps of:
   a) passing the gaseous stream through a first liquid in a vessel;
   b) breaking up the gaseous stream within the first liquid into a multitude of bubbles for causing substantial surface area contact between the gaseous stream and the first liquid;
   c) said breaking up including passing the gaseous stream through a plurality of slits disposed below the first liquid level, said openings being disposed in a depending side wall of an inverted cup;
   d) passing the gaseous stream through a second liquid after passing through the first liquid;
   e) breaking up the gaseous stream within the second liquid into a multitude of bubbles that are smaller in size than those generated in the first liquid for causing even greater surface area contact between the gaseous stream and the second liquid than in the first liquid; and
   f) said breaking up within the second liquid including passing the gaseous stream through a plurality of openings disposed in a top wall of an enclosure disposed in the second liquid.

* * * * *